(No Model.)
B. C. BATCHELLER.
CARRIER FOR PNEUMATIC TRANSIT APPARATUS.
No. 567,067. Patented Sept. 1, 1896.
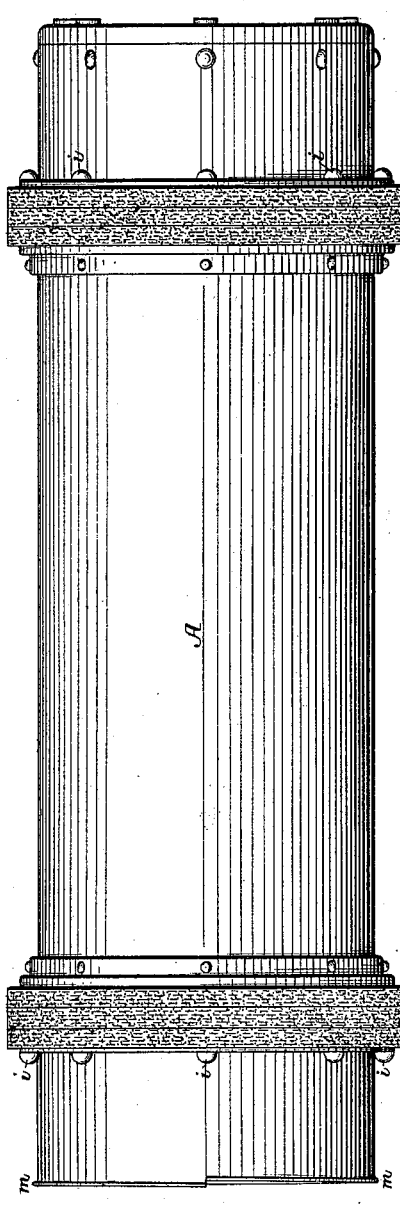
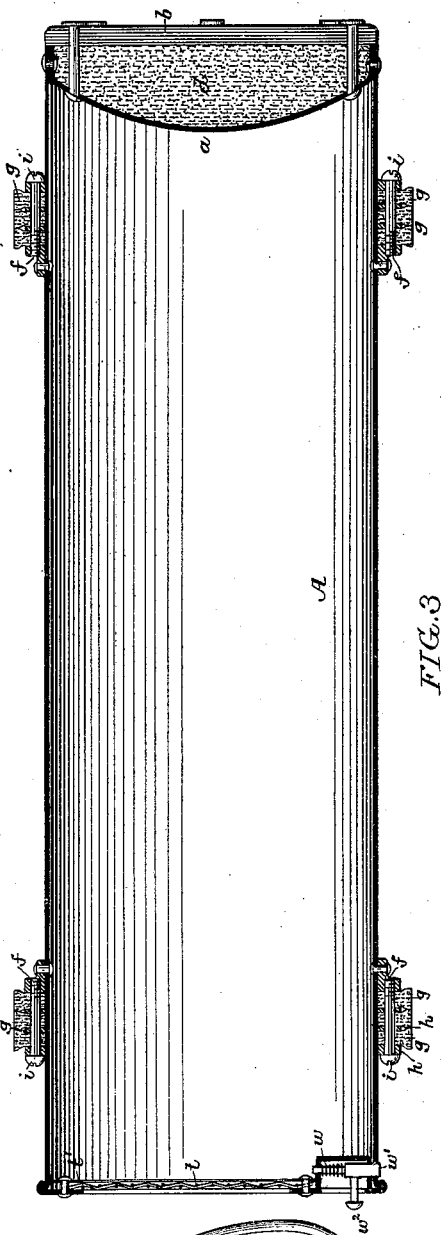
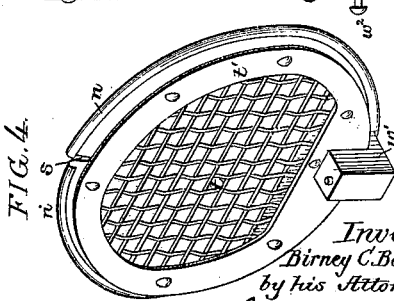
Witnesses:
R. Schleicher
Alex. Barkoff
Inventor:
Birney C. Batcheller
by his Attorneys
Howson & Howson

UNITED STATES PATENT OFFICE.

BIRNEY C. BATCHELLER, OF PHILADELPHIA, PENNSYLVANIA.

CARRIER FOR PNEUMATIC-TRANSIT APPARATUS.

SPECIFICATION forming part of Letters Patent No. 567,067, dated September 1, 1896.

Application filed December 15, 1892. Serial No. 455,222. (No model.)

*To all whom it may concern:*

Be it known that I, BIRNEY C. BATCHELLER, a citizen of the United States, and a resident of Philadelphia, Pennsylvania, have invented certain Improvements in Carriers for Pneumatic-Transit Apparatus, of which the following is a specification.

One object of my invention is to so construct a carrier for pneumatic-transit apparatus that the end cap of the carrier can be readily applied or removed, but cannot be accidentally detached, a further object being to prevent the blowing off of the cap by the expansion of air within the carrier when the latter leaves the pipe or conduit through which it has been caused to travel. These objects I attain in the manner hereinafter set forth, reference being had to the accompanying drawings, in which—

Figure 1 is a side view of a carrier for pneumatic-transit apparatus constructed in accordance with my invention, the removable end cap of the carrier being shown at Fig. 2. Fig. 3 is a sectional view of the carrier with the end cap applied thereto, and Fig. 4 is a perspective view of said cap looking at the inner side of the same.

A represents the cylindrical body of the carrier, which is preferably made of sheet metal and has at the forward end a head of any suitable character, this head usually possessing considerable bulk, as it sometimes acts as a buffer for the carrier when the latter leaves the pipe.

In the present instance the head is composed of a concavo-convex plate $a$ of sheet metal flanged at the edges and secured by riveting (or it may be secured by soldering or brazing) to the end portion of the tube A of the carrier, the outer plate or slab $b$ of the head consisting of a disk of rubber, leather, or like material, which is bolted or riveted to the plate $a$, packing $d$, of felt or other material, being interposed between the disk $b$ and the plate $a$, so as to deaden the force of the blow upon the said head.

Upon the body of the tube, some distance inward from each end of the same, are secured rings which support and guide the carrier in the pipe, it being understood that the body of the carrier is somewhat less in diameter than the pipe and that these rings fit with reasonable snugness to the bore of the pipe. Each of the rings consists, in the present instance, of an angle-bar $f$, bolted or riveted to the body of the pipe, a series of rings $g$, of felt or similar material, and a series of washers $h$, which alternate with the rings $g$, but are of less width than the same, so that the felt rings project beyond the washers, both rings and washers being perforated for the reception of bolts $i$, by which they are confined to the angle-bar $f$, any desired degree of compression being thus imparted to the rings $g$.

My improved carrier is one of that class intended for the transportation of mail matter or parcels through tubes of comparatively large diameter, such carriers being of considerable length; hence the securing of the packing and supporting-rings to the body of the carrier some distance inward from the ends of the same, so that the points of support of the carrier in the tube are brought as closely together as possible in order to facilitate the turning of sharp curves.

The rear end of the carrier is closed by a removable door or cover, so as to permit access to the interior of the carrier, when desired.

On the end of the carrier-body is formed a flange $m$, said end of the carrier-body being of spiral form, so that the flange forms a screw-thread, and the cap or cover B has around its periphery a hollow flange $n$, and has formed in it a radial slit $s$, so as to permit of the bending of one part of this flange in one direction and the other part in the opposite direction, in order to form a spiral corresponding to that of the flange $m$ on the body of the carrier and thus provide for the ready application of the cover to the carrier by a single turn of the same after the flanges have been brought into engagement.

A circumferential slit extending a short distance along the base of the hollow flange from the point of separation would answer the same purpose as the radial slit in permitting the bending of the cap so as to give the flange a spiral form.

The greater portion of the end plate or cover consists of a sheet $t$ of wire-netting, which is held in place by means of an internal ring $t'$, bolted or riveted to the body of the cap, so that when the carrier leaves the tube and is thus relieved from the pressure of air upon the rear end, the cap will not be likely to be blown off by the sudden expansion of the air under pressure which may have leaked into the interior of the carrier during the passage of the same through the pipe.

It will be evident that this same result might be obtained by perforating a sheet-metal cap or cover; hence I consider the latter plan to be within the scope of my invention, broadly considered.

In order to prevent any displacement of the cap due to the accidental unscrewing of the same, I provide the interior of the cap with a casing $w$, in which is guided a spring-bolt $w'$, having a stem $w^2$ projecting through a slot in the cap, this bolt engaging with an opening in the carrier when the cap has been screwed up to its full extent, but being readily withdrawn from said opening by means of the stem when it is desired to unscrew the cap.

Having thus described my invention, I claim and desire to secure by Letters Patent—

1. A carrier for pneumatic-transit apparatus, said carrier consisting of a tubular body having an interrupted spiral flange at the rear end, in combination with an end cap or cover having a hollow flange, and split radially so as to provide for the offsetting of said flange, substantially as specified.

2. A carrier for pneumatic-transit apparatus, said carrier having a detachable end plate or cover, with openings for the passage of air into and from the carrier, substantially as specified.

In testimony whereof I have signed my name to this specification in the presence of two subscribing witnesses.

BIRNEY C. BATCHELLER.

Witnesses:
FRANK E. BECHTOLD,
JOSEPH H. KLEIN.